(12) United States Patent
Matignon et al.

(10) Patent No.: US 9,587,670 B2
(45) Date of Patent: Mar. 7, 2017

(54) FITTING FOR AN AIRCRAFT BRACING DEVICE

(71) Applicant: AIRBUS SAS, Blagnac (FR)

(72) Inventors: Mickaël Matignon, Blagnac (FR); Francis Ramond, Toulouse (FR)

(73) Assignee: AIRBUS SAS (FR)

( * ) Notice: Subject to any disclaimer, the term of this patent is extended or adjusted under 35 U.S.C. 154(b) by 833 days.

(21) Appl. No.: 13/891,305

(22) Filed: May 10, 2013

(65) Prior Publication Data

US 2013/0302083 A1 Nov. 14, 2013

(30) Foreign Application Priority Data

May 11, 2012 (FR) ...................... 12 54321

(51) Int. Cl.
*F16C 11/06* (2006.01)
*B64F 5/00* (2006.01)
*B66C 1/10* (2006.01)

(52) U.S. Cl.
CPC ............ *F16C 11/06* (2013.01); *B64F 5/0009* (2013.01); *B64F 5/0036* (2013.01); *B66C 1/10* (2013.01); *Y10T 403/32* (2015.01); *Y10T 403/32631* (2015.01)

(58) Field of Classification Search
CPC ........ F16B 43/00; F16B 43/02; F16B 5/0216; F16B 5/1225; F16B 5/025; B64F 5/0036; B64F 5/0009
See application file for complete search history.

(56) References Cited

U.S. PATENT DOCUMENTS

| 5,141,357 A * | 8/1992 | Sherman ................. F16B 5/025 |
| | | 403/4 |
| 5,326,206 A * | 7/1994 | Moore .................. F16B 5/0208 |
| | | 29/525.02 |
| 5,823,588 A | 10/1998 | Morghen |
| 2009/0121079 A1 | 5/2009 | Stark et al. |

OTHER PUBLICATIONS

Anonymous: Chapter 06-00-00: FWD Fuselage Crane Lifting Fittings at FR15, Figure-06-50-00-991-015-A01, Airbus A318/A319/A320/A321 Aircraft Recovery Manual, Jul. 1, 2009 (Jul. 1, 2009), p. 7, XP002691129, Blagnac Cedex, France, Extrait de l'Internet: URL:http:fjwww.airbus.com/fileadminjmedia_gallery/files/tech_data/ARM/ARM_A318_A319_A320_A321_20090701.pdf.
Search report from corresponding French priority application.

* cited by examiner

*Primary Examiner* — Daniel Wiley
(74) *Attorney, Agent, or Firm* — Lerner, David, Littenberg, Krumholz & Mentlik, LLP

(57) ABSTRACT

A fitting for an aircraft bracing device including anchor points, wherein the fitting includes a face able to press against the aircraft and at least one guide hole for a connecting element able to collaborate with an anchor point, a slider able to move in a translational movement parallel to a first direction parallel to the face of the fitting and a connection between the slider and the connecting element which allows a movement in a second direction different from the first direction and parallel to the face of the fitting so as to align the connecting element with an anchor point.

11 Claims, 4 Drawing Sheets

FITTING FOR AN AIRCRAFT BRACING DEVICE

Figures 1, 2:
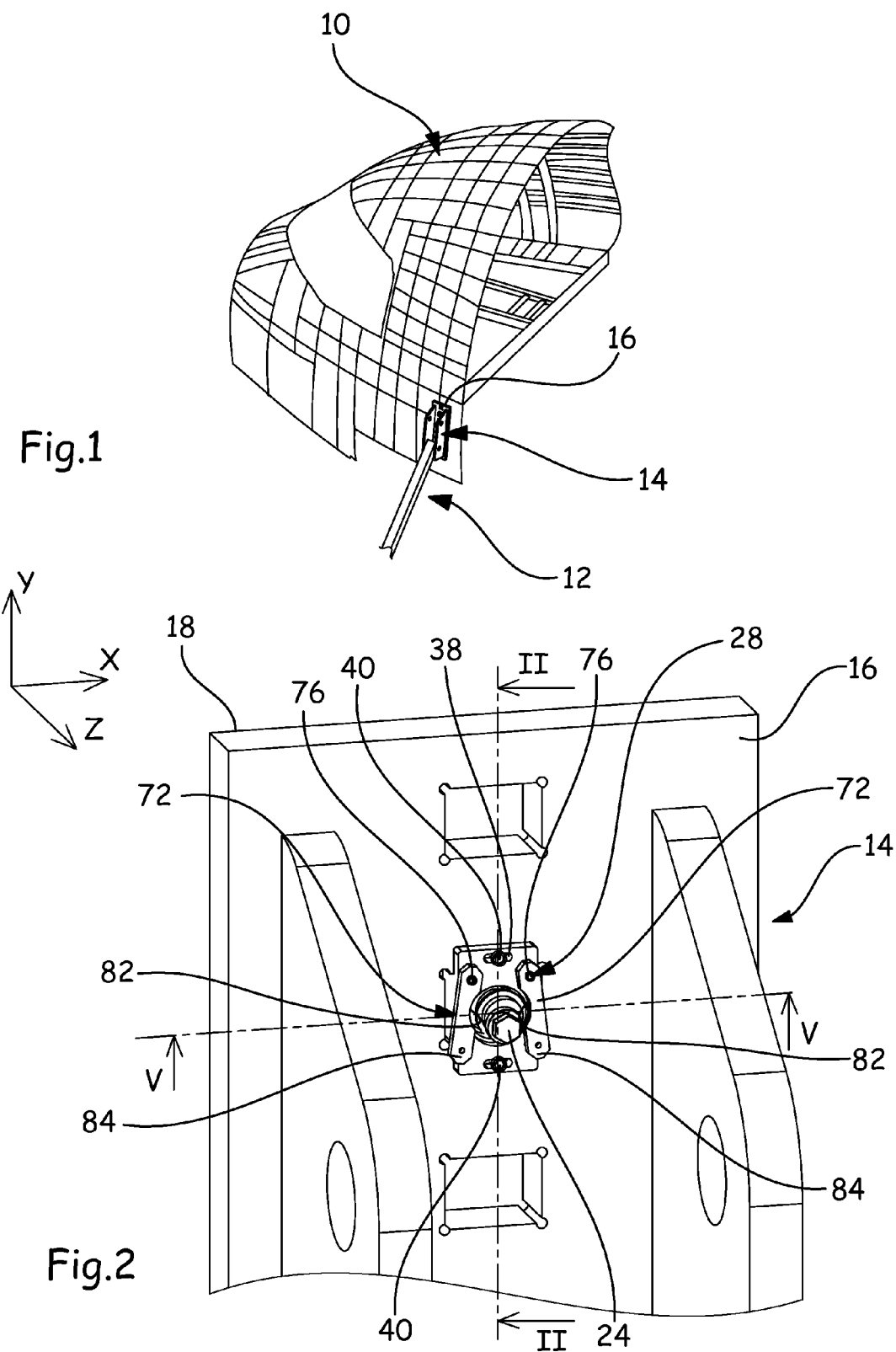

The present invention relates to a fitting for a device for bracing an aircraft.

While it is being manufactured, an aircraft needs to be able to be moved from one workstation to another along the assembly line.

In order to be able to move it, the aircraft is supported by bracing devices, each of them comprising at least one head connected to the aircraft. Each head comprises a plate known as a fitting that can be pressed firmly against the exterior wall of the aircraft, the said fitting comprising several holes each positioned to align with an insert provided on the aircraft. Screws pass through the holes in the fitting and are screwed into the inserts in order to join the fitting and the aircraft together.

In one embodiment, each hole comprises a guide ring the outside diameter of which is substantially equal to that of the hole and the inside diameter of which is substantially equal, with an allowance for clearances, to the outside diameter of the screw.

The location of the inserts is determined so that the stresses introduced by the bracing are as low as possible so as to limit deformation of the aircraft. The geometry of the bracing devices, the shape of the fittings and the positions of the holes in the fittings are determined according to the plans for the aircraft.

Because the position and orientation of the inserts conform to those indicated on the plans with an allowance for the tolerance bands, fitting the bracing devices at the time of assembly poses no problem.

In addition, the same bracing device can be used to support several aircraft of the same model in succession.

During the maintenance, the aircraft has to be braced in such a way that the stresses induced by the bracing are as low as possible so as to limit aircraft deformation, just like during manufacture.

Now, because the aircraft will have deformed after hours of flying, it is possible that the holes in the fittings may no longer correctly align with the inserts provided on the aircraft.

If the misalignment is great, it may prove impossible to connect the fitting to the aircraft and the fitting will then need to be configured to suit the actual geometry of the inserts. Because deformations differ from one aircraft to another, it may be necessary to configure the bracing devices differently from one aircraft to another (even within the same aircraft model), so as to make the holes in the fittings coincide with the inserts.

Another disadvantage is that from one maintenance operation to another, on one and the same aircraft, it may be necessary to reconfigure the fittings if the aircraft has become deformed between two maintenance operations.

One procedure for adapting a fitting is, for each hole that is no longer correctly aligned, is to make a hole the diameter of which is greater than the outside diameter of the guide ring. Next, the screw passing through the guide ring is screwed into the insert and resin is injected between the hole and the guide ring. After the resin has solidified, the fitting is secured to the aircraft and the bracing device is able to support the aircraft.

Adapting the bracing devices is a relatively lengthy and painstaking task and leads to an increase in the length of time for which the aircraft is grounded for maintenance.

Hence, aspects of the present invention seek to remedy the disadvantages of the prior art by proposing a fitting capable of adapting itself to suit the geometric variations of the anchor points provided on the aircraft.

To this end, the subject of the invention is a fitting for an aircraft bracing device comprising anchor points, the said fitting comprising a face able to press against the aircraft and at least one guide hole for a connecting element able to collaborate with an anchor point, characterized in that the fitting comprises a slider able to move in a translational movement parallel to a first direction parallel to the face of the fitting and a connection between the said slider and the connecting element which allows a movement in a second direction different from the first direction and parallel to the face of the fitting so as to align the said connecting element with an anchor point.

Figure 3:
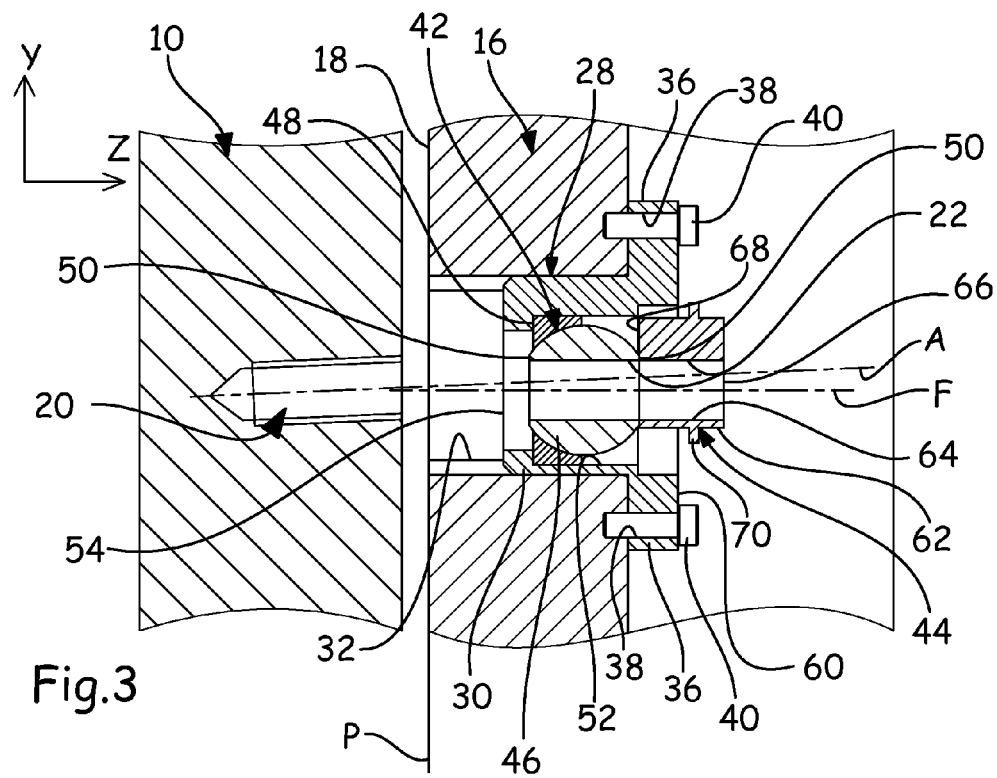
Figure 4:
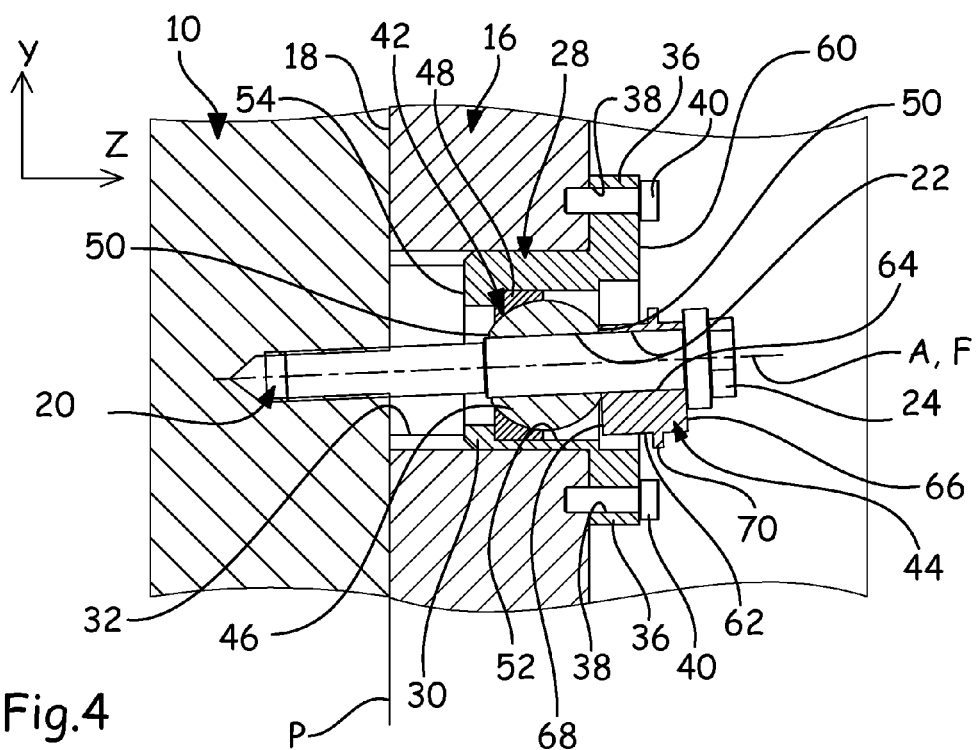
Figure 5:
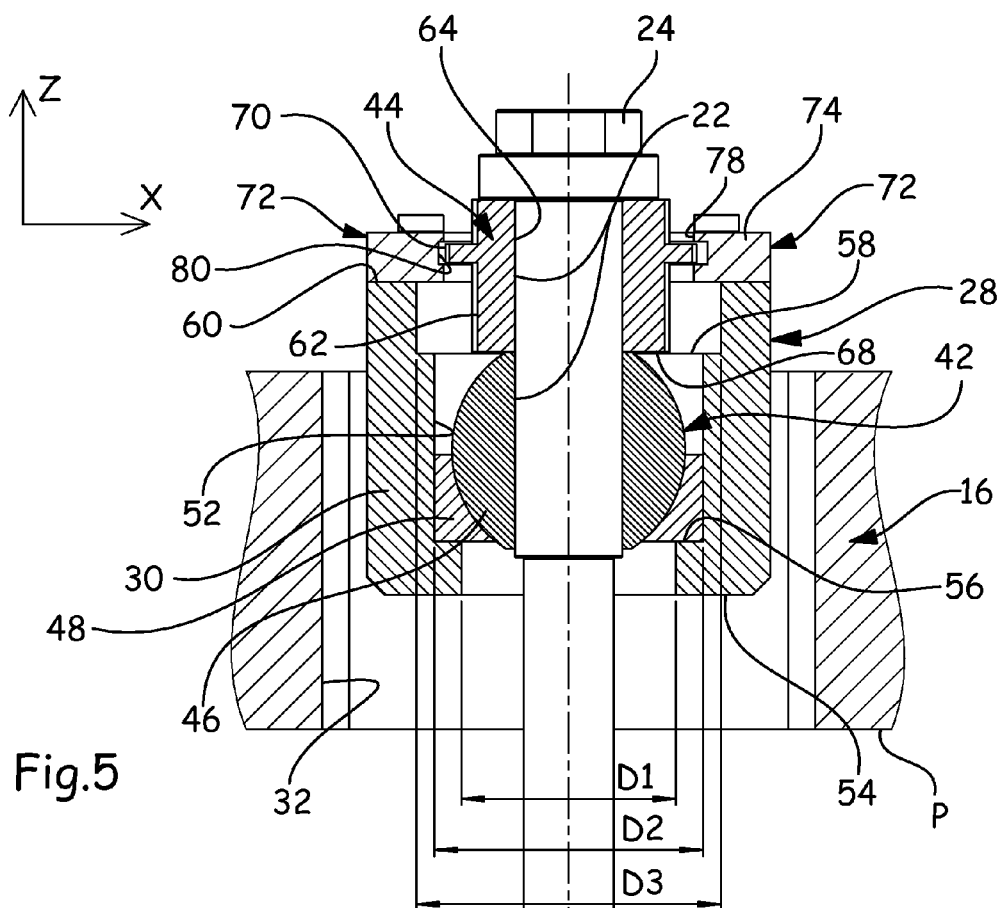
Figure 6:
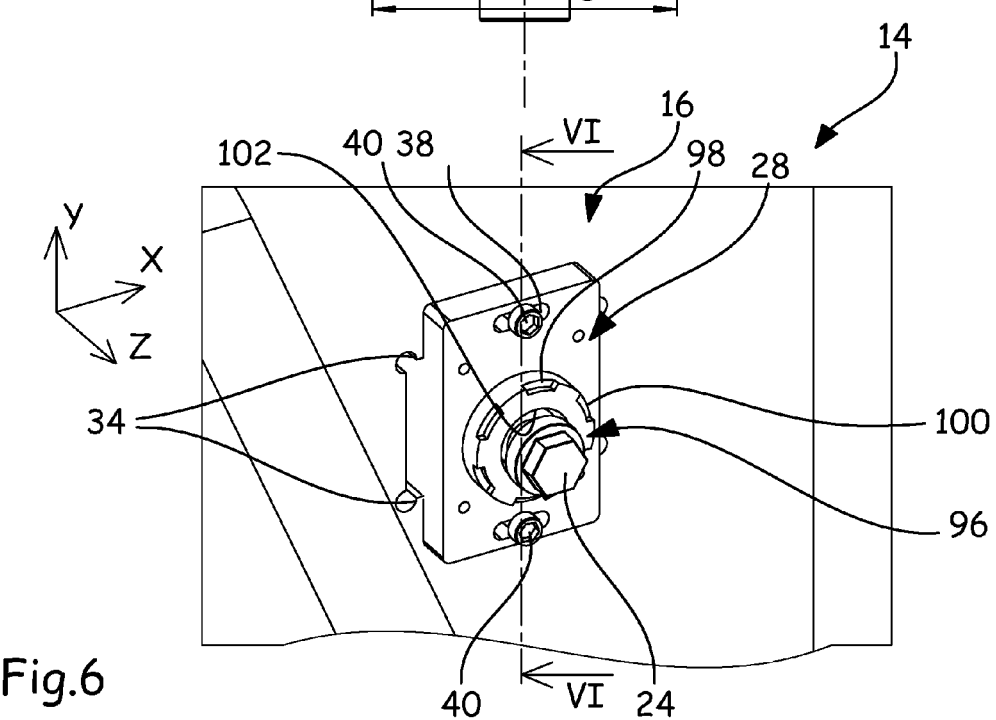
Figure 7:
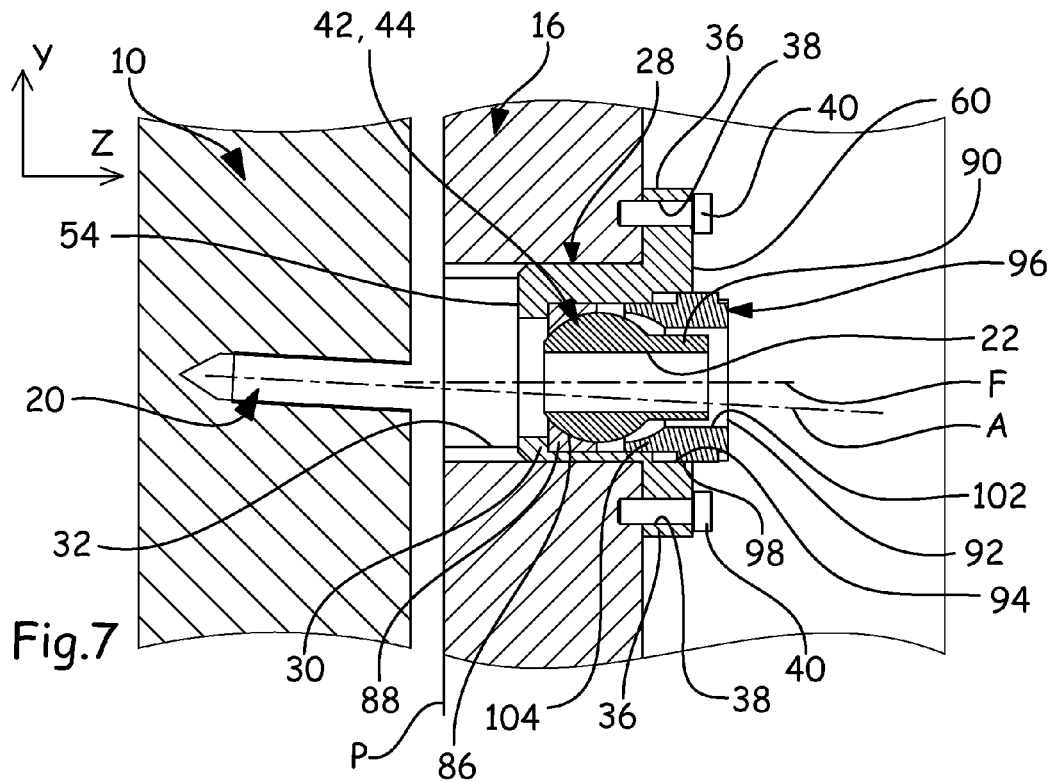
Figure 8:
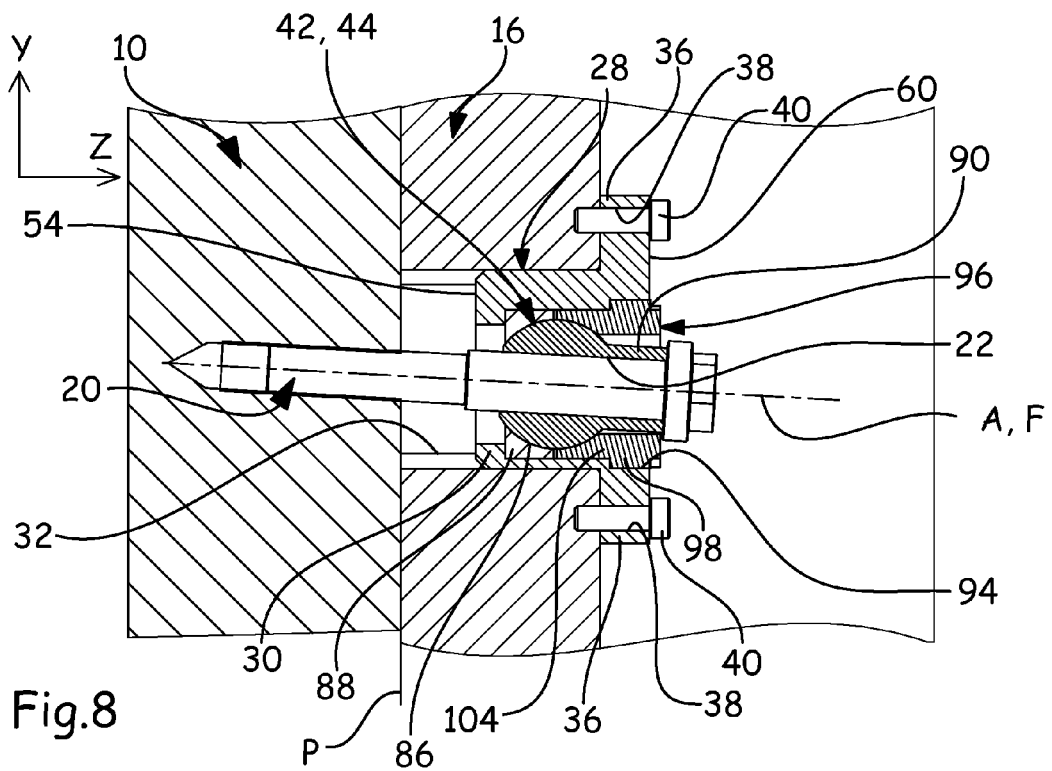

Other features and advantages will become apparent from the following description of the invention, which description is given solely by way of example, with reference to the attached drawings in which:

FIG. 1 is a perspective view of an aircraft bracing device,

FIG. 2 is a front view of a fitting according to a first embodiment of the invention, FIG. 3 is a view of the fitting of FIG. 2 in section on II-II, without fixing screws, FIG. 4 is a view of the fitting of FIG. 2 in section on II-II, with one fixing screw inserted into its anchor point, FIG. 5 is a view of the fitting of FIG. 2 in section on V-V, without fixing screws, FIG. 6 is a front view of a fitting according to another embodiment of the invention, FIG. 7 is a view of the fitting of FIG. 6 in section on VI-VI, without fixing screws, and FIG. 8 is a view of the fitting of FIG. 6 in section on VI-VI, with one fixing screw.

FIG. 1 depicts part of an aircraft 10 which part is supported by a bracing device 12 which comprises a head 14 connected removably to the part of the aircraft 10.

In the remainder of the description, an aircraft 10 means both the complete aircraft and parts of aircraft.

The head 14 comprises a plate hereinafter referred to as a fitting 16 of which one face 18 (visible in FIGS. 3, 4, 7 and 8) is pressed firmly against the aircraft 10 and defines a plane of contact P.

To secure the fitting removably to the aircraft, the latter comprises anchor points 20 of cylindrical shape having an axis A. According to one embodiment, an anchor point comprises an insert secured to the aircraft with a tapped hole. When the aircraft is being assembled, these anchor points are oriented and positioned according to the aircraft building plans in such a way that the stresses induced by the bracing are as low as possible so as to limit aircraft deformation.

To supplement that, the fitting 16 comprises at least one guide hole 22 with an axis F, in which a connecting element 24 is housed. According to one embodiment, the connecting element 24 is a screw that can be screwed into the tapped hole of the insert.

When the aircraft is being assembled, the axes A and F are more or less aligned.

In the remainder of the description, the direction Z means the direction perpendicular to the plane P. The direction X is contained in the plane P and is substantially horizontal. The direction Y is contained in the plane P and is substantially vertical. An XY plane corresponds to a plane parallel to the direction X and to the direction Y.

According to an embodiment of the invention, for at least one connecting element 24, the fitting 16 comprises a slider 28 able to move with respect to the rest of the fitting 16 in a translational movement in a first direction X parallel to the plane P, and a connection between the slider 28 and the connecting element 24 which allows a movement in a second direction Y different from the first direction X and parallel to the plane P.

As an alternative, the moving slider 28 may effect a translational movement in a direction Y and the connection between the slider 28 and the connecting element 24 may allow a movement in the direction X. Advantageously, the directions X and Y are perpendicular.

By virtue of these two degrees of freedom, the connecting elements can be fixed to the anchor points. Thus, the fitting according to an embodiment of the invention makes it possible to get rid of any variations in the positioning of the anchor points in relation to the aircraft construction plans.

Advantageously, the connection between the slider 28 and the connecting element 24 allows at least an orientation in the first direction X and/or in the second direction Y. Thus, the fitting according to an embodiment of the invention makes it possible to get rid of any variations in the orientation of the anchor points relative to the aircraft construction plans.

According to one embodiment, the slider 28 comprises a body 30 which is able to slide in the first direction X in a hole 32 formed in the fitting 16, the body 30 and the hole 32 having, in XY planes, cross sections the dimensions of which differ in the direction X and dimensions which are the same, with an allowance for a sliding tolerance, in the direction Y so as to allow the body 30 a translational movement in the direction X.

According to one embodiment, in XY planes, the hole 32 has rectangular cross sections, the length being directed in the direction X. To complement this, the body 30 has a cubic shape with square cross sections in XY planes. To make it easier for the body 30 to slide in the hole 32, the latter, at the corners, has drillings 34 (visible in FIG. 6), the axis of the drillings coinciding with the solid angles of intersection of the corners.

For preference, the slider 28 comprises at least one tab 36, advantageously two diametrically opposite tabs. Each tab 36 has at least one oblong hole 38 the longest length of which is oriented in the first direction X and through which a fixing element 40, for example a screw, that can be connected to the fitting 16 can pass, while at the same time allowing the translational movement of the body 30 in the hole 32 in the first direction X. This or these fixing element(s) 40 allows (allow) translational movement of the slider 28 relative to the fitting in the direction X to be blocked when the fixing elements are tightened.

According to one feature of the invention, the connection between the slider 28 and the connecting element 24 comprises a ball joint 42 and an eccentric 44 providing an offset in a plane XY. Thus, the ball joint 42 allows three rotations, notably a rotation about an axis parallel to the direction X and a rotation about an axis parallel to the direction Y, and the eccentric 44 allows movements in a plane XY that result from the combination of a translational movement parallel to the direction X and a translational movement parallel to the direction Y.

According to a first embodiment illustrated in FIGS. 2 to 5, the ball joint 42 and the eccentric 44 are separate.

In this embodiment, the ball joint 42 has, on the one hand, a spherical head 46 through which there passes a hole the axis of which passes through the centre of the spherical head 46, acting as a guide hole 22 and, on the other hand, at least one ring 48 with a spherical portion acting as a seat for the spherical head 46.

The spherical head 46 comprises a flat 50 perpendicular to the axis of the guide hole 22, at least in a region of the opposite end of the guide hole 22 to the aircraft.

According to one embodiment, the slider 28 comprises a through-hole 52 with an axis parallel to the direction Z, possibly centred with respect to the body 30 of the slider. In the region of the face 54 of the slider that is liable to be oriented towards the aircraft, the through-hole 52 has a diameter D1 which is widened in relation to the connecting element 24 so as to allow the latter to adopt various orientations.

The through-hole 52 comprises, offset from the face 54, a first shoulder 56 that forms a bearing surface for a ring 48 of the ball joint 42 and, offset from the first shoulder, a second shoulder 58. Between the two shoulders 56 and 58, the through-hole 52 has a diameter D2 which forms a bearing face for the ring 48 of the ball joint 42.

Between the second shoulder 58 and the face 60 of the slider which is the opposite face to the face 54, the through-hole 52 has a diameter D3 that forms a housing for the eccentric 44.

The eccentric 44 has a cylindrical exterior surface 62 and a through-hole 64 which is eccentric with respect to the exterior surface 62. The through-hole 64 has a diameter equal, with an allowance for clearances, to the outside diameter of the connecting element 24 and thus acts as a guide hole, supplementing the guide hole 22 of the ball joint.

The eccentric 44 has at a first end of the through-hole 64 a planar surface 66 forming a bearing surface for the connecting element 24 and at the other end a planar surface 68 able to bear against the flat 50 of the spherical head 46 of the ball joint 42.

The exterior surface 62 of the eccentric 44 has a diameter smaller than the diameter D3 so that the connecting element 24 can occupy various orientations.

Advantageously, the fitting comprises means for keeping the eccentric 44 and the ball joint 42 in their housing, notably during periods of non-use of the fitting.

According to one embodiment, the eccentric 44 comprises a peripheral rib 70 projecting from the exterior surface 62 thereof. To complement this, the slider 28 comprises at least one retainer 72 able to occupy a first position referred to as the blocked position, in which it holds the ball joint 42 and the eccentric 44 in the housing formed by the through-hole 52 and another position in which it allows the ball joint 42 and the eccentric 44 to be removed from the through-hole 52.

A retainer 72 comprises a bar 74 with, at one of its ends, an orifice 76 in which a threaded rod secured to the slider 28 can be lodged, allowing the bar 74 to pivot against the face 60 of the slider. This bar 74, at a region of an edge face 78 perpendicular to the face 60 and oriented towards the eccentric 44, has a slot 80 in which part of the peripheral rib 70 of the eccentric 44 can be lodged. Thus, this bar 74 is able to move between a first position in which the rib 70 interferes with the slot 80 and holds the ball joint and the eccentric in their housing, and a second position in which the rib does not interfere with the slot 80.

For preference, the bar 74 comprises a cutout 82 so as to collaborate with the cylindrical shape of the exterior surface 62 of the eccentric 44.

Means are preferably provided for keeping the retainer 72 in the blocked position. For that, at the opposite end from the orifice 76, the bar 74 comprises an orifice 84 able to house a threaded rod that can be screwed into the slider. Advantageously, the slider comprises two retainers 72 which are symmetric about the direction Y.

According to a second embodiment illustrated in FIGS. 6 to 8, the ball joint 42 and the eccentric 44 are not separate.

In this embodiment, the ball joint 42 comprises, on the one hand, a spherical head 86 through which there passes a hole that acts as a guide hole 22 and, on the other hand, a ring 88 comprising a spherical portion which collaborates with the spherical head 86.

In contrast with the preceding embodiment, the guide hole 22 does not pass through the centre of the spherical head 86 but is offset. Thus, the spherical head 86 also performs the eccentric 44 function.

In the direction facing away from the aircraft, the guide hole 22 is extended by a tube 90 which is produced as one piece with the spherical head 86. The free end of the tube 90 (the end away from the aircraft) comprises a planar surface 92 against which the connecting element 24 can bear.

As in the preceding embodiment, the slider 28 comprises a through-hole 52 with an axis parallel to the direction Z. In the region of that face 54 of the slider that is liable to face towards the aircraft, the through-hole 52 has a diameter D1 which is widened by comparison with the connecting element 24 so as to allow the latter to adopt several orientations.

The through-hole 52 comprises, offset from the face 54, a first shoulder 56 forming a bearing surface for a ring 88 of the ball joint 42 and, offset from the first shoulder, a second shoulder 58. Between the two shoulders 56 and 58, the through-hole 52 has a diameter D2 which forms a bearing face for the ring 88 of the ball joint 42.

Between the second shoulder 58 and the face 60 of the slider which is the opposite face to the face 54, the through-hole 52 has a diameter D3 a part 94 of which is tapped.

As with the preceding embodiment, the fitting comprises means for holding the ball joint 42 in its housing, notably during periods of non-use of the fitting.

According to one embodiment, the slider comprises a nut 96 of cylindrical shape with, in the region of its exterior surface, a threaded first part 98 collaborating with the tapped part 94 of the through-hole 52 and a second part 100 that has lugs for operating the nut 96.

This nut 96 comprises a through-orifice 102 through which the tube 90 of the spherical head 86 can pass irrespective of the orientation thereof.

This nut 96 comprises a continuation 104 with a spherical portion collaborating with the spherical head 86.

Whatever the embodiment considered, the slider 28 may comprise one or more through-holes 52 each having a ball joint and an eccentric which are intended for a connecting element 24.

Likewise, a fitting may comprise one or more sliders according to the invention.

The use of the slider according to an aspect of the invention is now described, irrespective of the embodiment.

First of all, the fitting is prepositioned, using, for example, a first screw mounted in a ring secured to the fitting oriented at a predetermined angle.

Next, the slider 28 is unblocked by unscrewing the fixing elements 40 to allow it a translational movement in the direction X.

The operator takes hold of the slider 28 in one hand and using the other hand positions the connecting element 24 so that the connecting element is correctly positioned relative to its anchor point, by adjusting the position of the slider 28 in the direction X, by causing the eccentric 44 to pivot. In addition, if necessary he may adjust the angle of incidence of the connecting element 24, using the ball joint 42.

Next, he can tighten the connecting element 24 then block the slider 28 in its position by retightening the fixing elements 40.

When the slider comprises two connecting elements 24, these are orientated and tightened simultaneously.

In general, the fitting comprises several sliders 28 and combines sliders according to the embodiment illustrated in FIGS. 2 to 5 with sliders according to the embodiment illustrated in FIGS. 6 to 8. Advantageously, the fitting comprises one slider according to the embodiment illustrated in FIGS. 6 to 8, in the middle of sliders according to the embodiment illustrated in FIGS. 2 to 5.

The invention claimed is:

1. A fitting for connecting an aircraft to a bracing device, said fitting comprising:
    a face configured to press against the aircraft;
    a hole formed in said fitting;
    a slider comprising:
        a body having a first through-hole defined therethrough, the body configured for translational movement within said hole in a first direction parallel to said face;
        a ball joint disposed within the first through-hole, and an eccentric engaged with the ball joint, and comprising a second through-hole; and
    a connecting element configured to pass through the second through-hole and engage with an anchor point on said aircraft; and;
    wherein the ball joint and the eccentric allow movement of the connecting element in a second direction different from the first direction and parallel to the face of the fitting so as to align said connecting element with the anchor point.

2. The fitting according to claim 1, wherein the slider comprises:
    at least one fixing element for blocking translational movement of said slider relative to the fitting in the first direction.

3. The fitting according to claim 1, wherein the ball joint comprises a spherical head disposed in the first through-hole and the eccentric bears against the spherical head, the eccentric further comprising an exterior surface, the second through-hole being eccentric relative to the exterior surface and coaxial with the hole and the first through-hole and being configured to receive the connecting element.

4. The fitting according to claim 3, wherein the ball joint and the eccentric are separate.

5. The fitting according to claim 4, wherein an axis of the hole passes through the centre of the spherical head, guiding the connecting element.

6. The fitting according to claim 4, wherein the eccentric has a cylindrical exterior surface, the second through-hole having a diameter equal, with an allowance for clearances, to an outside diameter of the connecting element, at a first end of the second through-hole, a planar surface forming a bearing surface for the connecting element, and at the other end a planar surface able to bear against the spherical head of the ball joint.

7. The fitting according to claim 4, further comprising means for keeping the eccentric and the ball joint in the first through-hole of the slider.

8. The fitting according to claim 7, wherein the eccentric comprises a peripheral rib projecting from the exterior surface thereof and wherein the slider comprises at least one bar with a slot, said bar being able to move between a first position in which said peripheral rib interferes with the slot and said bar holds the ball joint and the eccentric in the through-hole of the slider, and a second position in which the peripheral rib does not interfere with the slot.

9. A fitting for connecting an aircraft to a bracing device, said fitting comprising:
   a face configured to press against the aircraft;
   a hole formed in said fitting; and
   a slider comprising:
      a body having a first through-hole defined therethrough, the body configured for translational movement within said hole in a first direction parallel to said face; and
      a ball joint disposed within the first through-hole;
   wherein the ball joint comprises a spherical head through which a guide hole for guiding the connecting element passes, the guide hole having an axis which is offset from the centre of the spherical head so as to perform an eccentric function.

10. The fitting according to claim 9, further comprising means for holding the ball joint in the through-hole of the slider.

11. The fitting according to claim 10, wherein the slider comprises a nut of cylindrical shape with, in the region of its exterior surface, a threaded first part collaborating with a tapped part of the through-hole and a second part having lugs for operating the nut, said nut comprising a continuation with a spherical portion collaborating with the spherical head.

* * * * *